Nov. 16, 1965  E. J. PELOCHINO  3,217,774
FASTENER AND RETAINING MEANS THEREFOR
Filed Jan. 6, 1961
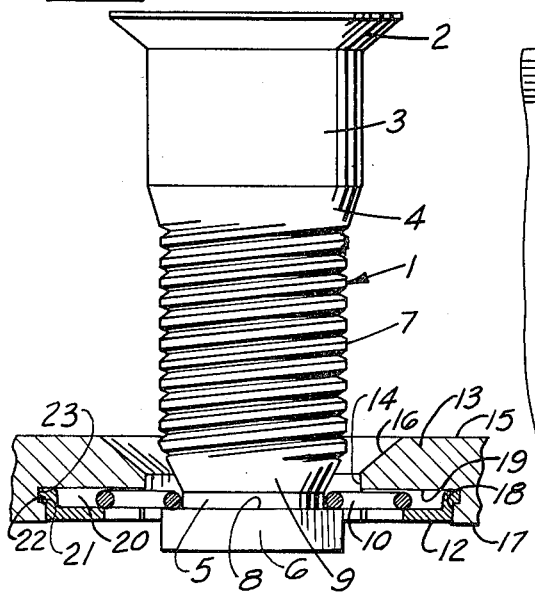
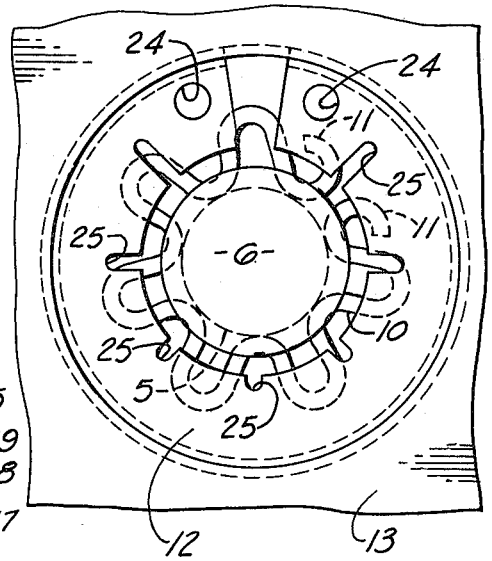
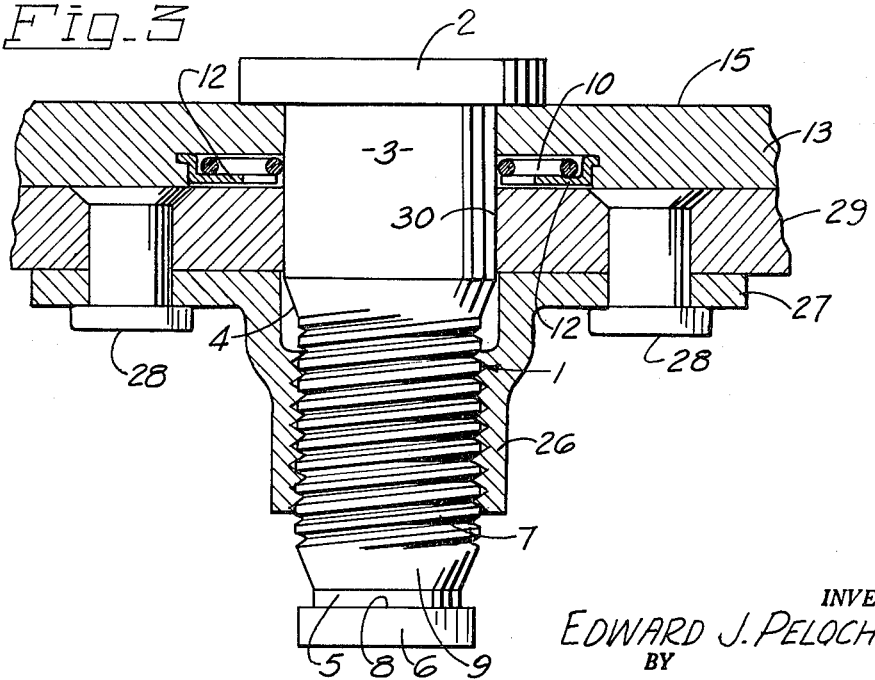
INVENTOR.
EDWARD J. PELOCHINO
BY

United States Patent Office 3,217,774
Patented Nov. 16, 1965

3,217,774
FASTENER AND RETAINING MEANS THEREFOR
Edward J. Pelochino, 716 S. Burris St., Compton, Calif.
Filed Jan. 6, 1961, Ser. No. 81,026
5 Claims. (Cl. 151—69)

The present invention relates to fastener retainers and more particularly to a fastener retainer for holding screw fasteners in position to be driven into threaded engagement with a complementally threaded member, as well as to a fastener particularly suited to use with the retainer.

While fastener retainers in accordance with this invention may be advantageously employed in diverse applications, they are particularly beneficial in instances where panels or other parts are to be secured in place as by means of a substantial number of fasteners. For example, in aircraft, panels of various shapes and sizes are removably mounted by means of a number of screws disposed about the periphery of the panel. When it is desired to remove the panel, the screw fasteners are removed from threaded engagement with the panel support, whereupon the screw fasteners may become displaced from the screw holes in the panel, rendering replacement of the panel awkward and time-consuming. Moreover these lost screws in some instances may not be readily replaceable.

A principal object of the present invention is to provide a fastener retainer adapted to be carried in the screw hole of a panel or other member to be supported and to engage the screw fastener so as to retain the screw fastener against inadvertent displacement from the opening, while maintaining the screw fastener in a proper attitude for re-engagement with the complemental thread of the support. Thus, it is apparent that the invention is admirably suited to use as a panel fastener retainer so that the panel fasteners will all be securely held in position to be driven into engagement with a panel support, thereby materially facilitating handling and placement of the panel.

Another object is to provide a fastener retainer which is easily applicable to an opening in a member through which the fastener is to extend, so that the fastener is freely rotatable in the opening but is precluded from inadvertent displacement therefrom.

In carrying out the foregoing objectives a retainer is provided which is simple to manufacture and install, in combination with a fastener particularly adapted to be employed with the retainer.

A further object is to provide a fastener retaining means which enables simple yet efficient application of the retainer means to a panel or other member, in a manner requiring only slight modifications of the panel or other member for the fastener. This objective is achieved by the utilization of a washer member adapted to be disposed in a counterbore aligned with the fastener opening in the panel or other support, the washer having a flange disposed transversely of the counterbore and forming with the base of the counterbore a space for the reception of a resilient star-like retainer element having portions engageable with the stem of a fastener so as to retain the latter in position in the fastener opening to enable the fastener to be driven into a threaded support to which the panel or other member is to be applied.

The fastener of the invention is formed in such a manner as to cooperate with the star-like retainer in a novel manner which facilitates movement of the fastener through the retainer to and from a fully retracted position and a position at which the fastener is engageable with the threads of the support into which the fastener is to be threaded. In this connection, it is an object of the invention to provide a novel fastener having an annular channel adjacent its lead end in which the star-like washer is engageable with the fastener to firmly hold the latter in a retracted position so that the fastener will not become displaced from the panel or other member. In addition, I provide the fastener with a thread form which enables ease of movement through the star-like retainer without necessitating excessive working or flexing of the star-like washer. In this connection I provide the fastener with a thread having a crest surface extending axially of the screw body, i.e. the thread is truncated so as to have a reduced radial extension at the crest of the thread. Such a thread form accordingly reduces deflection or working of the star-like retainer and movement of the screw longitudinally through the retainer is facilitated.

Yet another object is to provide a novel retainer for a fastener wherein a star-like spring retainer is held in operative position in the counterbore aligned with the fastener opening in a panel or other member by means of a split snap ring washer having a peripheral edge disposable in an undercut groove in the panel or other member extending outwardly from the counterbore, the snap ring being split at one side and slotted radially at a plurality of circumferentially spaced locations, the slots being of progressively diminishing length from the split at one side of the snap ring towards the side of the snap ring diametrically opposed to the split side. The snap ring is thus adapted to be deformed by an installation tool engageable with the ends of the snap ring at the split in a substantially uniform manner; that is, deformation of the snap ring is distributed about the snap ring so that it retains its circular form.

Other objects and advantages of the invention will be hereinafter described or will become apparent to those skilled in the art, and the novel features of the invention will be defined in the appended claims.

In the drawing:

FIG. 1 is a view showing in section a fragmentary portion of a panel or other member with the novel retainer of the invention applied thereto, and showing in elevation a fastener made in accordance with the invention and retained in a fully projected position;

FIG. 2 is a bottom plan view of the assembly of FIG. 1; and

FIG. 3 is a view partly in section showing a panel or other member secured to a support by a fastener shown in elevation and made in accordance with the invention.

Like reference characters in the several views of the drawing and in the following detailed description designate corresponding parts.

The novel fastener of the invention is illustrated in FIG. 1 as having a stem 1 provided at one end with a head 2 of the type adapted to be countersunk. Adjacent its headed end the stem has a cylindrical shank 3 which merges with a tapered section 4. In longitudinally spaced relation to the taper 4, the stem is provided with an annular recess 5, and at the lead end of the stem is an abutment flange 6. Between the recess 5 and the taper 4 the stem is provided with a threaded section 7. The interface 8 of the flange 6 is substantially normal to the axis of the fastener and forms one wall of the recess 5, while the opposing wall of the recess is formed by a tapered surface 9 diverging towards the head of the fastener. Threads 7 are provided with a substantially square crest, and the threads are preferably truncated V-section threads adapted to engage in a standard nut or other member having a V-section female thread.

The novel retainer of the invention comprises means for shiftably supporting the fastener in a retracted position as shown in FIG. 1, so that the fastener is not readily separable from the member which is provided with the retainer means, but the fastener is movable longitudinally in the other direction through the retainer means so as to be engaged in a female threaded member.

The retainer means hereof is illustrated as comprising a resilient star-like spring wire member 10 of sinuous circumferentially extended form, having angularly separated terminals 11 whereby the star-like member is circumferentially expansible. A holding washer 12 provides means for holding the star-like retainer in place in a panel or other member 13 to be supported.

Panel or other member 13 has a bore 14 therethrough for passage of the fastener stem 1. At the outer face 15 of the panel or other member 13, in the embodiment of FIG. 1, it is countersunk at 16 for reception of the fastener head 2. At the inner side 17 of the panel or other member 13 it is counterbored as at 18 for the reception of the holding washer 12. Washer 12 is opposed to the base 19 of the counterbore so as to provide an annular space 20 in which the star-like retainer member 10 is freely disposed. Sufficient free space is provided so that the retainer means is expansible to enable passage of the shank 3 of fastener stem 1 therethrough.

In the illustrative embodiment, the washer is generally of the split snap ring type and has an outer peripheral wall 21 engageable in the counterbore 18, and having at its inner edge an outwardly extending flange 22 engageable in an undercut slot 23 in the panel or other member 13.

As best seen in FIG. 2, the split snap ring 12 is provided at its terminals adjacent the split with openings 24 engageable by a conventional application tool, as is well known in the art. Preferably, the split snap ring 12 is formed in a manner facilitating installation in the counterbore 18. In this connection, the split snap ring is radially slotted in a plurality of locations, the slots being designated 25 and beink equidistantly spaced in relation to the split in the ring 12 and being longest adjacent the split, and being progressively shorter towards a slot located diametrically opposite to the split. Hence, an application tool may be engaged in openings 24 to stress the ring and move the terminals towards one another, resulting in a substantially uniform circumferential contraction of the ring 12, whereby installation in the counterbore 18 is facilitated.

Referring to FIG. 3, the fastener is illustrated as being driven into a supporting female threaded nut 26 having a supporting flange 27 secured by rivets 28, or otherwise suitably mounted on a member 29 to which the panel or other member 13 is to be connected. The fastener shown in FIG. 3 is in all essential respects identical to that illustrated in FIG. 1, but while the head of the fastener of FIG. 1 is formed complementally to the countersunk 16, the fastener head of FIG. 3 engages flush with the outer surface 15 of the panel or other member.

In use of the fastener retaining means and fastener described above, the fastener is supported in the retainer means in a fully retracted position as shown in FIG. 1, so that inadvertent displacement and/or loss of the fastener is prevented by engagement of flange 6 with the retainer means 12. When the panel or other member is to be applied to a support such as the member 29, the respective fasteners are roughly aligned with the openings 30 in the member 29. A force applied to the fastener head in a longitudinal direction will cause tapered surface 9 on the fastener to cam the star-like spring retainer outwardly in annular space 20.

Threaded section 7 of the fastener stem will move readily through the retainer as the flat crested threads lessen the tendency of the fastener to become cocked or bound within the retainer means 12. The tapered surface 4 at the head end of threaded section 7 engages with the opening 30 in member 29 so as to cause alignment of the bore 14 in member 13 with the opening 30 in member 29.

Moreover, it has been found that truncating the threads of the fastener to the extent that the resultant thread height is slightly greater than the pitch diameter of a normal V-thread did not adversely affect the holding capacity of the fastener under tension loads insofar as established aircraft panel fastener specifications are concerned.

From the foregoing it will not be apparent that the novel features and objectives set forth at the commencement hereof, as well as others, are fully accomplished by the invention. The novel features of the invention will be defined in the appended claims, though changes and alterations may be resorted to within the purview of the invention.

I claim:

1. A fastener device comprising: a member having a bore and a counterbore, a fastener having a stem extending through said bore and counterbore, a head on said fastener engageable with said member to limit movement of said fastener through said member in one direction, said stem having an external thread thereon, resilient retainer means disposed in said counterbore and engaged with said fastener stem, holding means supported in said counterbore and holding said retainer means in said counterbore, and means including an annular recess at the lead end of said stem forming on one side a shoulder on said fastener stem engageable by said retainer means for supporting said fastener in a retracted position in said bore and counterbore, said holding means comprising a washer disposed in said counterbore and having a portion opposed to the base of said counterbore for confining said retainer means in said counterbore.

2. A fastener device comprising: a member having a bore and a counterbore, a fastener having a stem extending through said bore and counterbore, a head on said fastener engageable with said member to limit movement of said fastener through said member in one direction, said stem having an external thread thereon, resilient retainer means disposed in said counterbore and engaged with said fastener stem, holding means supported in said counterbore and holding said retainer means in said counterbore, and means including an annular recess at the lead end of said stem forming on one side a shoulder on said fastener stem engageable by said retainer means for supporting said fastener in a retracted position in said bore and counterbore, said holding means comprising a split snap ring, said member having a groove extending outwardly from said counterbore, and said snap ring having marginal portions disposed in said groove.

3. A fastener and retainer means therefor, comprising in combination, a fastener having an externally threaded stem, said stem having at one end, an inwardly tapered annular wall tapering toward the extremity of said stem, an abrupt shoulder on said end facing said tapered wall and defining therewith an annular recess, and spring retainer means having radially expansible portions disposed in said recess expansible radially by said tapered wall and abuttingly engageable with said abrupt shoulder, the thread adjacent said tapered wall having a truncated crest, and a head at the other end of said stem.

4. A fastener device comprising: a member having an opening therethrough, a stem disposed in said opening, a head at one end of said stem larger than said opening, said stem having an external thread with truncated crests between its ends, said stem having a tapered surface converging from said thread and also having an abrupt shoulder adjacent the other end of said stem, said converging surface and said shoulder forming an annular peripheral recess, said member having a counterbore at the opposite side of said member from said head, resilient retainer means engageable with said member in said counterbore and engageable in said annular peripheral recess with said abrupt shoulder to prevent retraction of said stem from said member, said retainer means being expansible by said tapered surface and said truncated crests of said thread to enable movement of said stem through said retainer means to effect engagement between said head and said member.

5. A fastener device as defined in claim 4, wherein a means is provided to hold said retainer means in said counterbore.

References Cited by the Examiner

UNITED STATES PATENTS

| | | | |
|---|---|---|---|
| 1,548,586 | 8/1925 | Edkins | 24—218 |
| 2,465,741 | 3/1949 | Nalle | 151—69 |
| 2,521,127 | 9/1950 | Price | 285—321 |
| 2,896,684 | 7/1959 | Zahodiakin | 151—41.7 |
| 2,972,367 | 2/1961 | Wootton | 151—69 |
| 2,991,816 | 7/1961 | Harbison et al. | 151—69 |
| 3,093,179 | 6/1963 | Zahodiakin | 151—69 |

FOREIGN PATENTS 262,051  9/1949  Switzerland.

EDWARD C. ALLEN, *Primary Examiner*.

CARL W. TOMLIN, *Examiner*.